UNITED STATES PATENT OFFICE.

BERTHOLD WUTH AND CARL JAGERSPACHER, OF BASEL, SWITZERLAND, ASSIGNORS TO SOCIETY OF CHEMICAL INDUSTRY IN BASLE, OF BASEL, SWITZERLAND.

COPPER COMPOUNDS OF ORTHOOXYAZO DYESTUFFS AND A PROCESS OF MAKING SAME.

1,233,433.  Specification of Letters Patent.  Patented July 17, 1917.

No Drawing.  Application filed October 7, 1915.  Serial No. 54,504.

*To all whom it may concern:*

Be it known that we, BERTHOLD WUTH, chemist, a subject of the King of Great Britain, and CARL JAGERSPACHER, chemist, a citizen of the Swiss Republic, both residents of Basel, Switzerland, have invented New Copper Compounds of Orthooxyazo Dyestuffs and Processes of Making Same, of which the following is a full, clear, and exact specification.

In the United States application for Letters Patent, Ser. No. 43,413, filed August 3, 1915, is described the production of new well defined copper compounds of orthooxyazo dyestuffs, which are soluble in water. We have now found, that the orthooxydiazo dyestuffs derived from the polycyclic ring systems containing a $CH_2$ group able to combine with a diazo group, as for instance diketohydroinden

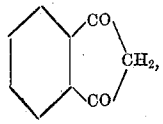

perinaphthindandion.

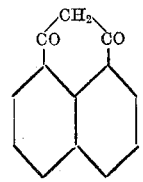

3-oxy-1-thionaphthen

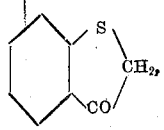

ketocumaran

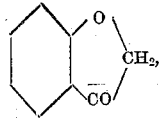

indoxyl

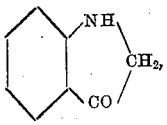

or their derivatives or substitution products, can also be transformed into new copper compounds by their treatment with copper compounds as for instance copper salts, copper oxid or copper hydroxid. The copper compounds soluble in water thus obtained, from which the copper cannot be precipitated by sodium carbonate, soda lye and ammonia, yield in an acid bath on animal fibers as for instance wool, silk and leather, further on straw and wood-bast valuable, red, brown, violet-blue to black tints of good fastness to washing and to light, which are distinguished from the orthooxyazo dyestuffs employed as parent materials by entirely different shades and by a better fastness to washing and to light. The new copper compounds dissolve in concentrated sulfuric acid to deep colored solutions and in water to intense colored solutions which do not change their coloration on addition of sodium carbonate or of soda lye.

The preparation of the heretofore unknown dyestuffs from orthodiazophenol derivates or orthodiazonaphthol derivates and perinaphthindandion, ketocumaran, indoxyl, etc., takes place in the usual way by combining the orthooxydiazo compounds with the said components in an alkaline solution as it is illustrated by the following examples:

Example 1: 24 parts of 1:2:4-aminonaphtholsulfonic acid are diazotized in the known manner and mixed with a soda alkaline solution of 20 parts perinaphthindan dion dissolved in 14 parts of soda lye of 3 per cent. The combination being achieved, the dyestuff is separated, pressed and dried It dissolves in water to brown-red and in concentrated sulfuric acid to blue solutions and dyes wool in an acid bath violet-brown shades.

The preparation of the copper compound of the said orthooxyazo dyestuffs is illustrated by the following examples:

Example 2: 24 parts of the dyestuff obtained, according to Example 1, from 1:2:4-diazonaphtholsulfonic acid and perinaphthindandion are dissolved in 1000 parts hot water at 80° C. and into the thus obtained solution is poured a solution of 13 parts of copper sulfate in 50 parts water. The copper compound separates at once as a black precipitate. After neutralization of the freed sulfuric acid with sodium carbonate, the new copper compound is isolated by filtration, pressed and dried. It dyes wool in an acid bath brown-red shades very fast to washing and to light.

Example 3: 21 parts of the dyestuff resulting from the 1:2:4-diazonaphtholsulfonic acid and oxythionaphthen are dissolved in 700 parts water and to this solution are added at about 70° C. a solution of 13 parts copper sulfate in 50 parts water. The blue copper compound precipitates at once. After neutralization with sodium carbonate, the new copper compound is separated by filtration, pressed and dried. It yields on wool in an acid bath very pure violet-blue shades fast to washing, alkali and light, while the orthooxyazo dyestuff employed as parent material yields valueless roseate tints.

The following tabular exhibit relates to several copper compounds obtainable according to the invention:

| Dyestuff resulting from— | | Dyeing of the sodium salt from acid bath on wool. | Dyeing of the copper salt from acid bath on wool. |
|---|---|---|---|
| The diazo derivate of— | And— | | |
| 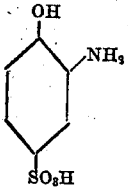 | Diketohydroinden | Yellow-brown | Red-brown. |
| 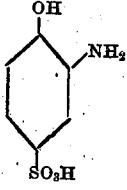 | Indoxyl | Red-brown | Violet. |
|  | 6-Methylketocumaran 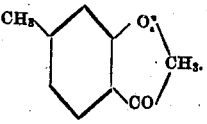 | Yellow | Violet. |
| 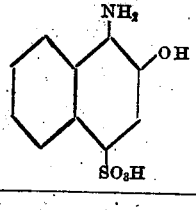 | Diketohydroinden | Red-brown | Violet. |
| 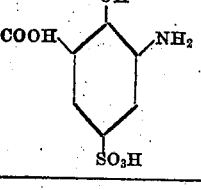 | Diketohydroinden | Orange | Red-brown. |
| 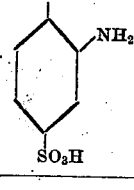 | Perinaphthindandion | Yellow-orange | Red-brown. |
| 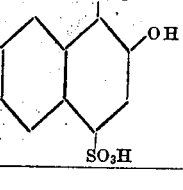 | Perinaphthindandion | Violet-brown | Bordeaux. |

| Dyestuff resulting from | | Dyeing of the sodium salt from acid bath on wool. | Dyeing of the copper salt from acid bath on wool. |
| --- | --- | --- | --- |
| The diazo derivate of— | And— | | |
| [Structure: benzene ring with OH, NH₂, COOH, SO₃H] | Perinaphthindandion | Red-orange | Yellow-brown. |
| [Structure: benzene ring with OH, NH₂, SO₃H] | 3-Oxy-1-thionaphthen | Red-brown | Red violet. |
| [Structure: benzene ring with OH, NH₂, SO₂H, CH₃] | 3-Oxy-1-thionaphthen | Red-brown | Violet. |
| [Structure: naphthalene with NH₂, OH, SO₃H] | 3-Oxy-1-thionaphthen | Roseate | Pure violet-blue. |
| [Structure: naphthalene with NH₂, OH, SO₃H] | 6-Methylketocumaran [Structure: ring with CH₃, O, CH₂, CO] | Red-brown | Blue. |
| [Structure: naphthalene with NH₂, OH, NO₂, SO₃H] | 3-Oxy-1-thionaphthen | Roseate | Black-violet. |
| [Structure: naphthalene with OH, NH₂, SO₃H, NO₂] | 3-Oxy-1-thionaphthen | Brown-violet | Violet-black. |

What we claim is:

1. The described process for the manufacture of new copper compounds of ortho-oxyazo dyestuffs, soluble in water, consisting in treating with copper compounds in a water medium the orthooxyazo dyestuffs derived from polycyclic ring systems containing a $CH_2$ group able to combine with a diazo-group.

2. The described process for the manufacture of new copper compounds of orthooxyazo dyestuffs, soluble in water, consisting in treating with copper compounds in a watery medium the orthooxyazo dyestuffs resulting from the combination of orthooxydiazo bodies with the polycyclic ring systems containing a $CH_2$ group able to combine with a diazo-group.

3. As new products the described copper compounds of orthooxyazo dyestuffs, which contain an azo group combined to a $CH_2$ group of a polycyclic ring system, are soluble in water, from which the copper can not be precipitated by sodium carbonate, soda lye and ammonia and which constitute red, brown, violet and blue to black powders, dissolving in concentrated sulfuric acid to deep colored solutions and in water to intense colored solutions which do not change their coloration on addition of sodium carbonate or soda lye and from which the animal fibers as wool, silk and leather, straw and wood-bast are dyed, according to the methods used for acid dyestuffs, red, brown, violet and blue to black tints showing without any further treatment a very good fastness to washing and to light.

In witness whereof we have hereunto signed our names this 11th day of September, 1915, in the presence of two subscribing witnesses.

DR. BERTHOLD WUTH.
DR. CARL JAGERSPACHER.

Witnesses:
ARNOLD ZUBER,
AMAND RITTER.